A. KNEIP.
SPRING WHEEL.
APPLICATION FILED APR. 12, 1910.
970,835.
Patented Sept. 20, 1910.
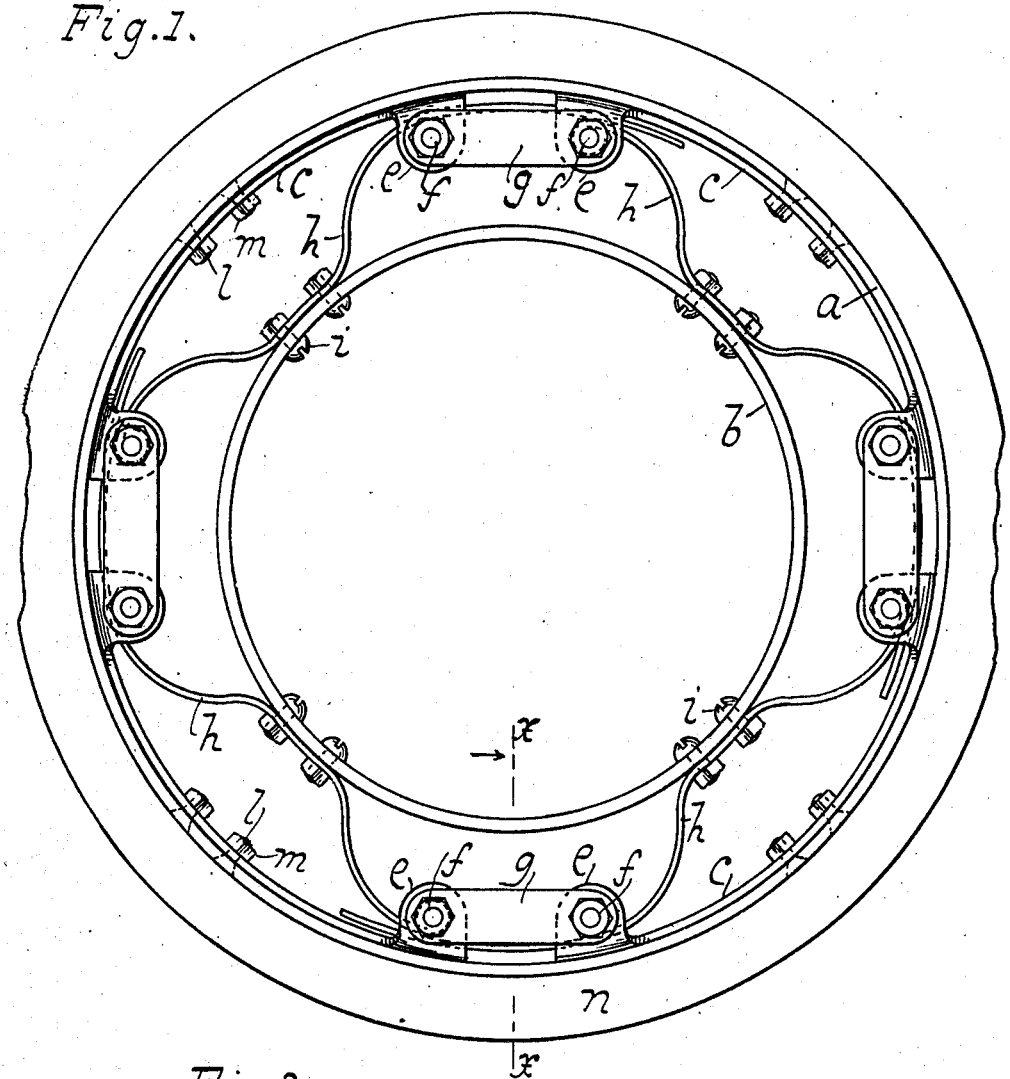
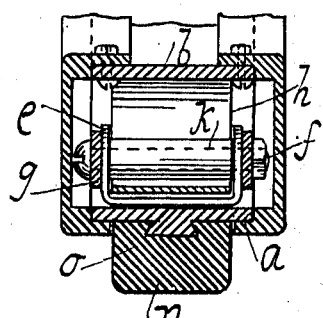
Witnesses:
William Miller
Christian Almstaedt
Inventor
Anton Kneip
By his Attorneys

UNITED STATES PATENT OFFICE.

ANTON KNEIP, OF MASPETH, NEW YORK, ASSIGNOR OF ONE-HALF TO WILLIAM E. BELLION, OF BROOKLYN, NEW YORK.

SPRING-WHEEL.

970,835. Specification of Letters Patent. Patented Sept. 20, 1910.

Application filed April 12, 1910. Serial No. 555,070.

*To all whom it may concern:*

Be it known that I, ANTON KNEIP, a citizen of the United States, residing at Maspeth, in the county of Queens and State of New York, have invented new and useful Improvements in Spring-Wheels, of which the following is a specification.

My invention relates to an improved tire for vehicles and is designed principally to be used on automobiles.

The object of the invention is to provide a tire which is nonpuncturable and at the same time light and has the same spring and resilient effect as a pneumatic tire would have.

My tire is adapted to absorb shocks whether given vertically or tangentially.

In the accompanying drawing:—Figure 1 represents a side sectional view of a tire embodying this invention. Fig. 2 is a cross sectional view taken along the line $x$ $x$ Fig. 1.

In the accompanying drawing $a$ represents an outer metal band. There is also an inner metal band $b$ which fits over the rim of the wheel not shown. To the inner side of the band $a$ is fastened a series of springs $c$. These springs $c$ are provided with ears $e$ and each pair of ears $e$ has a bolt $f$, to which is connected links $g$. Springs $h$ are fastened securely to one of the bolts $f$ while the other end freely engages the adjacent bolt, which adjacent bolt has a loose revolving roller or collar $k$ so that the springs $h$ can play freely on this revolving collar $k$. The springs $c$ are fastened to the band $a$ by bolts $l$ having a nut $m$.

The band $a$ may be covered with any suitable covering of leather or rubber $n$ shown in Fig. 2 which is fastened to the band $a$ by a projection or any other well known and desired manner.

The springs $c$ in combination with the spring $h$ take up vertical as well as tangential shocks no matter in what position the tire contacts with the ground.

I of course do not wish to be limited to any number of springs $c$ and $h$ and while only four are shown in the accompanying drawing I may have one for each spoke of the wheel if desired or any suitable number.

The device may be secured to the rim of the wheel by bolts or any desired manner.

I claim:—

1. A spring wheel comprising an outer and an inner metal band, a series of springs secured to and normally in contact with the outer band, and a series of springs fastened to the inner band, each of said inner springs having one end connected to one of the outer springs, and the other end in contact with and engaging the said outer spring.

2. A spring wheel, comprising an outer and an inner metal band, a series of springs secured to and normally in contact with the outer band, bolts carried by the outer springs, and a series of springs fastened to the inner band, said inner springs each having one of their ends connected to one of said bolts and the other end in contact with and engaging a pair of said outer springs.

3. A spring wheel consisting of an outer metal band and an inner metal band, springs secured to the said outer metal band, ears on said springs, bolts in said ears and links connecting the springs, springs having one end rigidly secured to one of the bolts, the other end working freely on a bolt, said last named springs being also secured to the inner band.

4. A spring wheel consisting of an outer metal band and an inner metal band, a series of outer springs connected to the outer metal band, ears in said outer spring a series of inner springs secured to the inner band, one end of said inner springs being rigidly fastened to a bolt in the outer spring and the other end working freely under a bolt in the other end of the outer spring.

5. A spring wheel consisting of an outer metal band and an inner metal band, a series of outer springs fastened to the outer metal band, ears in said springs, links connecting said outer springs, a bolt in each end of the outer springs, one of said bolts having a revolving collar, a series of inner springs, placed opposite the outer springs and fastened to the inner band, one end of each inner spring being fastened to a bolt in one end of the outer spring, and the other end of said inner spring adapted to pass under and act freely on the bolt with the revolving collar in the outer spring, substantially as shown and described.

In testimony whereof I have hereunto set my hand in the presence of two subscribing witnesses.

ANTON KNEIP.

Witnesses:
WM. E. WARLAND,
CHRISTIAN ALMSTAEDT.